US007556398B2

(12) United States Patent
Van Der Poel

(10) Patent No.: US 7,556,398 B2
(45) Date of Patent: Jul. 7, 2009

(54) LIGHTING UNIT

(75) Inventor: Lucas Leo Desiree Van Der Poel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 224 days.

(21) Appl. No.: 10/597,748

(22) PCT Filed: Jan. 28, 2005

(86) PCT No.: PCT/IB2005/050376

§ 371 (c)(1), (2), (4) Date: Aug. 7, 2006

(87) PCT Pub. No.: WO2005/078335

PCT Pub. Date: Aug. 25, 2005

(65) Prior Publication Data

US 2008/0144311 A1 Jun. 19, 2008

(30) Foreign Application Priority Data

Feb. 10, 2004 (EP) ................................. 04100487

(51) Int. Cl.

| | |
|---|---|
| ***B60Q 1/26*** | (2006.01) |
| ***F21V 33/00*** | (2006.01) |
| ***F21V 21/00*** | (2006.01) |
| ***F21V 21/26*** | (2006.01) |
| ***F21V 17/06*** | (2006.01) |
| ***H01R 33/00*** | (2006.01) |
| ***H01R 31/00*** | (2006.01) |

(52) U.S. Cl. ......................... 362/227; 362/95; 362/184; 362/249.1; 362/269; 362/429; 362/435; 362/650; 439/642

(58) Field of Classification Search ......... 362/649–651, 362/95, 184, 378, 429, 435, 443, 448, 269, 362/249.1, 647; 439/642

See application file for complete search history.

(56) References Cited

U.S. PATENT DOCUMENTS

| | | | | |
|---|---|---|---|---|
| 4,783,726 | A * | 11/1988 | Wang | 362/252 |
| 5,072,341 | A * | 12/1991 | Huang | 362/96 |
| 5,082,422 | A * | 1/1992 | Wang | 416/5 |
| 5,121,287 | A * | 6/1992 | Lee | 361/600 |
| 5,186,659 | A * | 2/1993 | Hefner | 439/643 |
| 5,749,646 | A * | 5/1998 | Brittell | 362/231 |
| 6,036,331 | A * | 3/2000 | Acquisto | 362/96 |
| 6,203,174 | B1 * | 3/2001 | Plumeyer | 362/277 |
| 2004/0004828 | A1 * | 1/2004 | Chernick et al. | 362/35 |
| 2004/0264187 | A1 * | 12/2004 | Vanderschuit | 362/235 |
| 2005/0099810 | A1 * | 5/2005 | Tasson et al. | 362/250 |
| 2005/0135107 | A1 * | 6/2005 | Currie et al. | 362/382 |

* cited by examiner

*Primary Examiner*—Jong-Suk (James) Lee
*Assistant Examiner*—David J Makiya

(57) ABSTRACT

The invention relates to a lighting unit, comprising a first light element formed as a conventional light source, a second light element formed as a plurality of LEDs and a lamp cap. According to the invention the second light element is formed as a separate LED module with a fitting and a second lamp cap whereby the first and the second light elements are removably attached via the fitting and the second lamp cap, the fitting and second lamp cap providing electrical and mechanical connection between both light elements. The invented lighting unit is cost-effective and has better mixing possibilities of the light produced by both light elements.

23 Claims, 4 Drawing Sheets

LIGHTING UNIT

Figure 1:
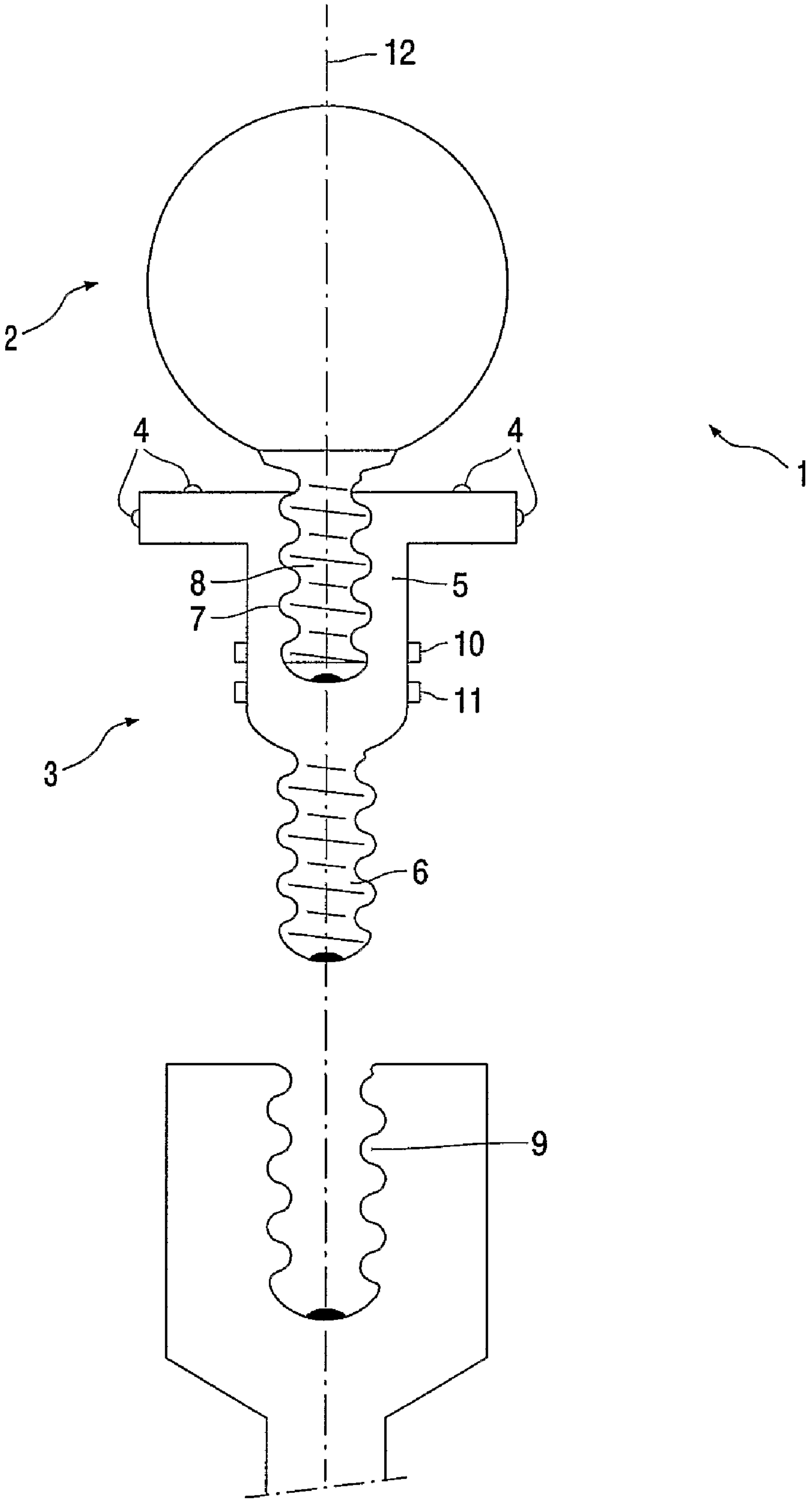

The invention relates to a lighting unit, comprising a first light element formed as a conventional light source, a second light element formed as a plurality of LEDs and a lamp cap. The invention relates also to a LED-module suitable for use in such lighting unit.

A lighting unit of the type mentioned in the opening paragraph is known per se. For instance, the international patent application with publication number WO 00/63977 in the name of Applicant describes such lighting unit. More precisely, it describes a lighting unit with a first light element formed as a incandescent lamp with a spirally wound wire located on a support part, a conventional transparent envelope positioned around said wire and placed on said support part as well as a conventional cap attached to said support part. As a second light element a plurality of LEDs are also attached within the envelope to said support part.

It is a drawback of the known lighting unit that, during operation of both light sources, the mixing of the radiation generated by the light sources is not optimal. This is i.a. due to the fact that the distance between the light sources is rather limited. Moreover, the comparatively short service time of the incandescent lamp causes that the lighting unit has to be replaced relatively often. As the LEDs are rather expensive, this frequent replacement makes the use of the lighting unit rather expensive.

It is an object of the invention to improve the existing lighting unit. It is a further object of the invention to improve especially the possibilities to mix the radiation of the light sources at operation of the lighting unit. The invention should also provide a cost-effective lighting unit.

These and other objects are achieved by a lighting unit according to the first paragraph, which is further characterized in that that the second light element is formed as a separate LED-module with a fitting and a second lamp cap whereby the first and the second light elements are removably attached via the fitting and the second lamp cap, the fitting and second lamp cap providing electrical and mechanical connection between both light elements.

The invention is based on the recognition that the permanent connection of both lighting elements in the known lighting unit results in several disadvantages.

Firstly, this permanent connection causes that the whole light unit should be replaced in case that one of both light elements breaks down. Compared with LEDs having a service time of more than 75,000 hrs, the service time of less than 1,000 hrs reached with an incandescent lamp is rather short. This fact causes that in the known lighting unit in most cases the incandescent first light element breaks down first. This causes that also the second light element with the rather expensive LEDs are to be replaced together with the first light element. In a lighting unit according to the present invention, it suffices to remove the first lighting element and to replace it by a new first lighting element. The second lighting element can remain present in the invented lighting unit.

Secondly, the distance between the first and second light element is rather limited due to standardisation of the size of the envelope. By placing the LEDs outside the envelope, a better mixing between the radiation of the first lighting element (the incandescent lamp part) and the second lighting element (the LED lamp part) can be obtained during their operation.

It is observed that conventional fittings and caps can be used in the lighting unit according to the present invention, like the ones according to standards E14 and E27. Bajonet connections can also be used. Is should be noted that an electrical connection between the first and second light elements via such fitting and cap combination is necessary in order to operate the first lighting element. Such combination also provides for the necessary mechanical strength in the attachment between both light elements. It is stressed that, although the invention is explained by a first light element in the form of an incandescent lamp, light elements with other light sources can also be used, like a compact fluorescent lamp. Even a conventionally formed light element in which LEDs replace the spirally wound wire can be applied with great advantage in a lighting unit according to the present invention.

The LEDs used in the second light element can be any kind. Preferably they have a light output during operation of at least 10 lm/W, more preferably of at least 20 lm/W. Yellow/red light emitting LEDs on the basis of GaP as well as blue and green light emitting LEDs on the basis of GaN can be used in the light module. However, they can also be of the type InGaN emitting in the green, blue or UV area, of the InGaAlP emitting in the red or amber area or of any other desired type. If needed it is also possible to use PC-LEDs (phosphor converted LEDs), in which the emitted light of the LEDs is converted by means of phosphors to a radiation having a different wavelength. In this way LEDs emitting substantially white light can be made. As will be understood by skilled in the art, the LED-module contains the necessary electronics for operation the LEDs under optimal electrical conditions.

For practical reasons, the cap and the fitting of the LED-module will be positioned on opposite parts of the module. Most generally, the rotational axis defined by the structure of the cap and the fitting will coincide and also form the rotational axis of the module itself. The LEDs are preferably positioned on the outside surface of the housing of the module.

An interesting embodiment of the presently invented lighting unit is characterized in that the LED module is provided with a number of protruding elements, which are evenly distributed around the housing of the module, and that the protruding elements comprise a plurality of LEDs. The presence of protruding elements makes that the distance between the LEDs and the first light source can be given the optimal distance, whereas the overall size of the module remains rather limited. The optimal distance is determined by an optimal mixing of the light emitted by the LEDs and the light emitted by the first light element. In order to provide a light distribution, which is as symmetrical as possible, the protruding elements should be evenly distributed around said housing. Reasonable results can already be obtained with 3 protruding elements, which are attached under a mutual angle of about 120 degrees to the housing. Better results are achieved with four or more protruding elements.

From a practical point of use, a preferred embodiment of the lighting unit is characterized in that the protruding elements can rotate around the rotational axis with respect to the housing. The rotation may be effected manually. If an electric motor is present in the housing of the LED-module, permanent rotation of the protruding elements during operation of the lighting unit can be achieved. During rotation of the protruding elements, air flows along the LEDs, which is advantageous in view of their cooling. This air flow effect can be enhanced by specific structures of the protruding elements. Moreover an attractable light and colour rotation of LED light structures projected to the ceiling is obtained under these circumstances.

Latter embodiment preferably comprises diffuser elements. In case that the light and colour rotation should be less pronounced, said diffuser elements can be manually positioned in front of the emissition direction of the LEDs. The diffuser elements can be attached to the protrusions. In that case they can be folded in and outside the emission direction of the LEDs via a hinge. Alternatively the diffusers can be attached to the housing as a separate set of protrusions, which is also rotatable with the same rotation velocity as the protrusions comprising the LEDs. Also in this case the diffusers can be moved outside or inside the emission direction of the LEDs.

A further interesting embodiment of the lighting unit according to the present invention is characterized in that the LED module comprises at least two types of LEDs emitting in operation radiation with a different wavelength, and that the types of LEDs can be activated independently. It has been demonstrated that lighting units with this feature interesting light mixing properties with the first light element. This holds especially if the LED module comprises three types of LEDs, emitting on operation the colours Red, Green and Blue. The activation of the LEDs types emitting the same colour can be achieved by activation means being present on the module itself, for example in the form of mechanical on/off switches. Light modules of this type can be used with great advantage in standing luminaries (with shades).

A complete 'ambient' lighting solution can be provided by means of the present invention in case that the first and/or the second lighting element can be dimmed. Electronics for dimming both conventional light sources like incandescent lamps, halogen and compact fluorescent lamps are known to persons skilled in the art. This holds also for dimming electronics for LED lighting. For the ease of the user, the dimming can preferably be effected on distance. In that case the LED-module should also comprise a signal receiver for receiving dimming signals from a signal transmitter, which is used by the user of the invented light unit.

The inventions also relates to a LED-module suitable for use in a lighting unit as described before. Due to the presence of the conventional fitting and lamp cap, such lighting module can be used as a 'retrofit' module in existing standing luminaries (with shades).

Figure 2:
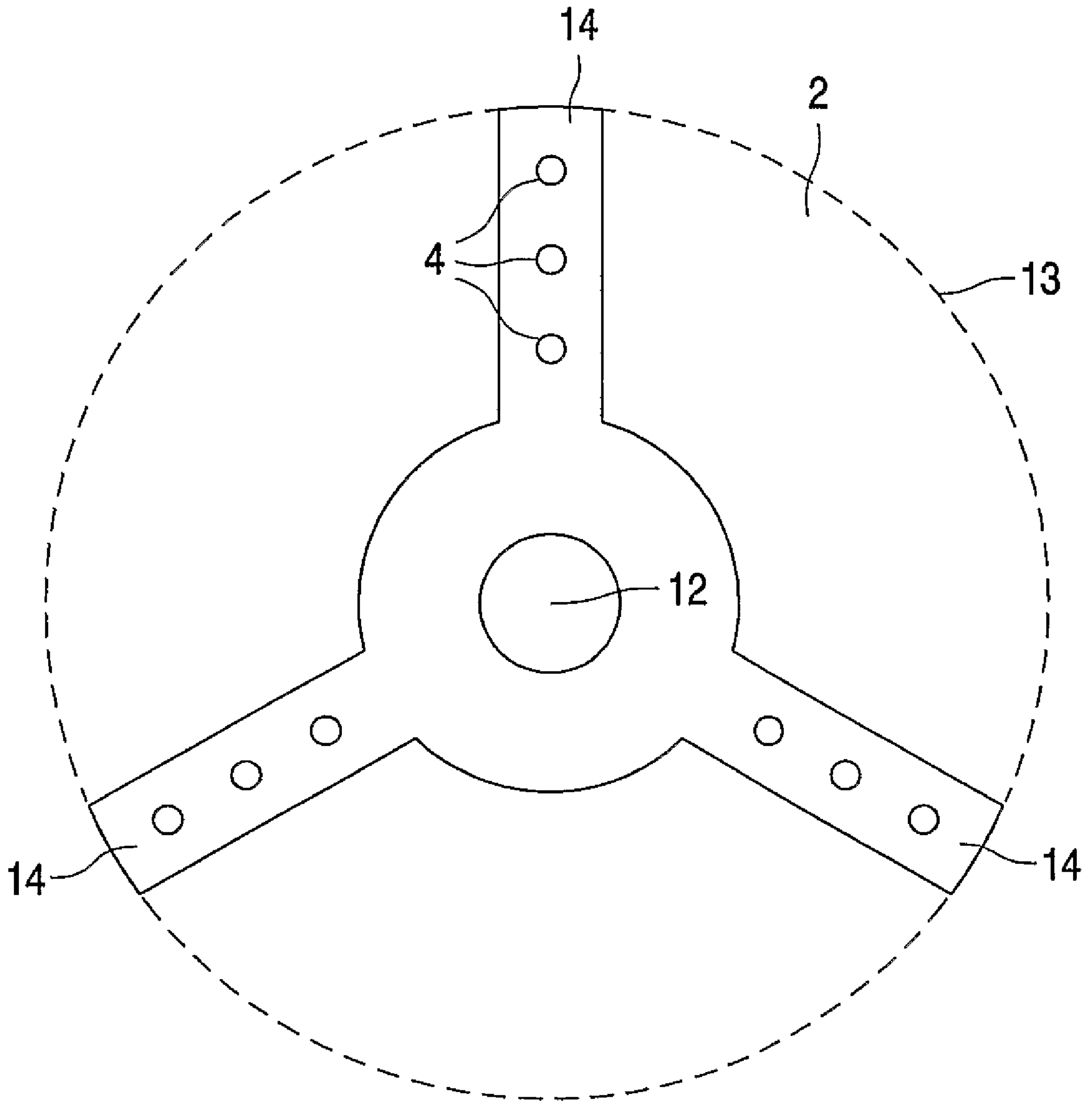
Figure 3A:
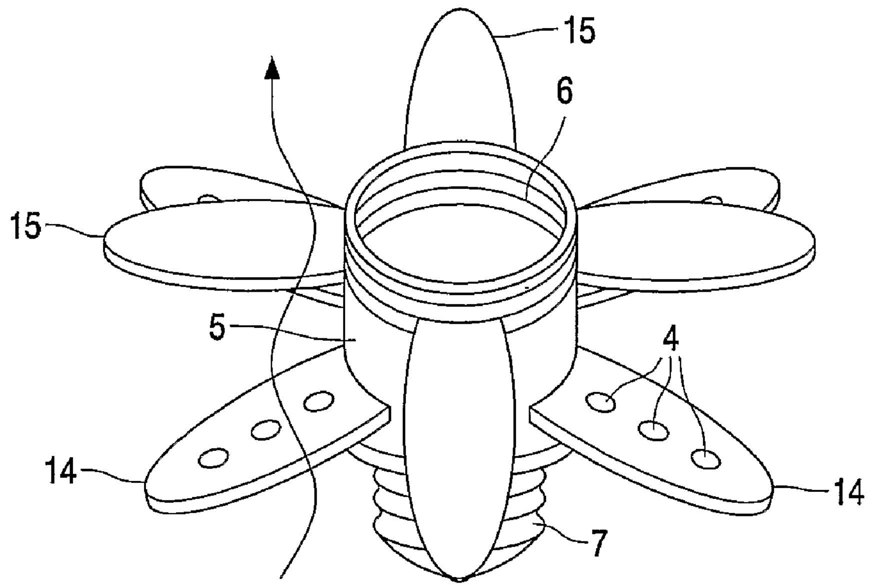
Figure 3B:
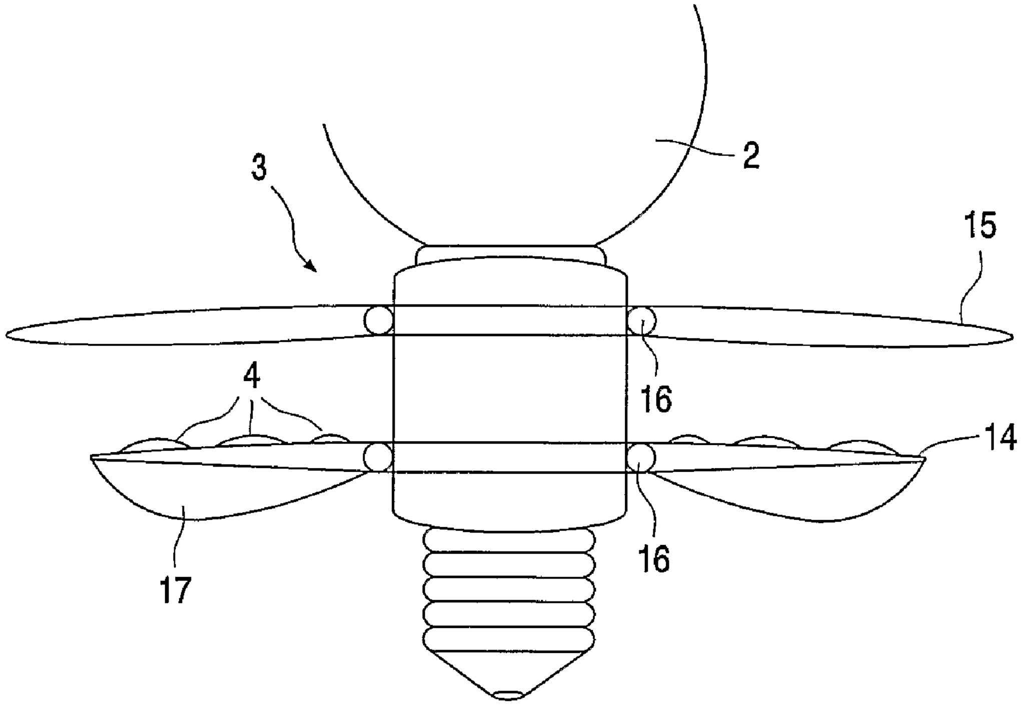
Figure 4:
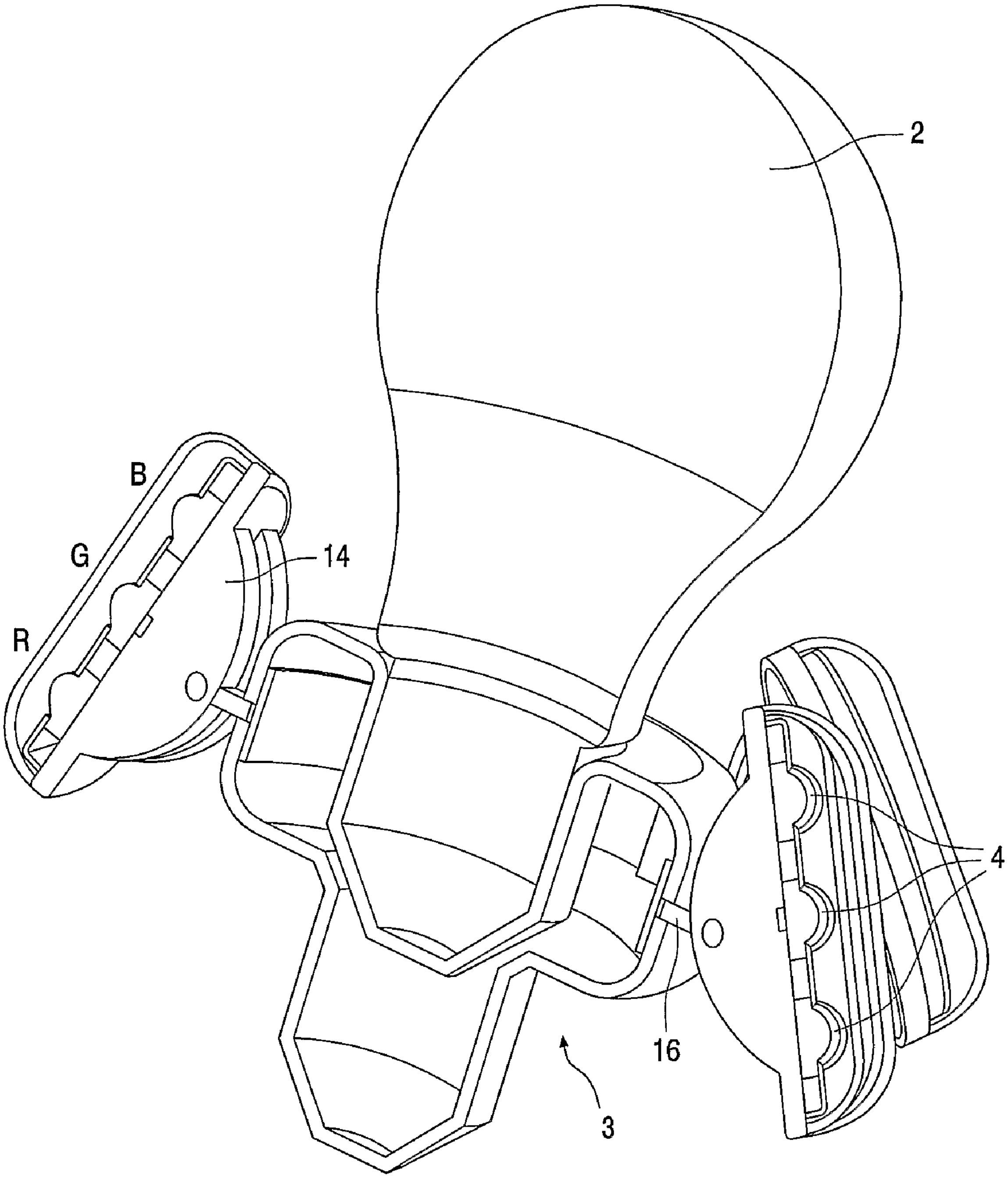

These and other aspects of the invention will be apparent from and elucidated with reference to the embodiments described hereinafter and a drawing, in which:

FIG. 1 shows a first embodiment of a light unit according to the present invention, FIG. 2 shows a schematic top view of a second embodiment of the light unit according to the invention, FIG. 3 shows two front views of a third embodiment of a light unit according to the invention, FIG. 4 shows a schematic view of another embodiment of a light unit according to the present invention.

The Figures are purely diagrammatic and not drawn true to scale. Dimensions may be exaggerated for reasons of clarity. In the Figures equivalent parts have been given as much as possible the same reference number.

FIG. 1 shows a through sectional view of a lighting unit (1) according to the present invention. More precisely it comprises a first light element (2) formed as a conventional incandescent lamp. It is stressed that in case of an incandescent lamp also other conventional lamps can be used, such as compact fluorescent lamps or halogen lamps. It is even possible to use a lamp of conventional lamp shape with a number of LEDs instead of the conventional wire of a conventional incandescent lamp. The unit (1) also comprises a second light element (3), which is formed as a plurality of LEDs (4) positioned on a housing (5). The light unit also comprises a conventional lamp cap (6) of the type E14 or E17.

According to the invention, the first light element (2) and the second light element (3) are removably attached via fitting (7) and a second lamp cap (8), both of the type E14 or E17. Usually the same type of connection will be used for the first and the second lamp cap. The first lamp cap can be attached to a fitting (9) of a standing luminaire (with shades), which is not shown in detail. This fitting (8) does not form part of the lighting unit according to the present invention. From FIG. 1 it can easily be derived that the second light element (2) can be used as an independent lighting module suitable for use in a 'retrofit' module in existing standing luminaries (with shades).

Housing (5) of second light element (3) comprises the necessary electronic circuitry for operating the LEDs. For reasons of clarity neither this required circuitry nor the electrical connection between the first light element (2) and the second light element (3) are drawn in detail. Those skilled in the art are fully familiar with these aspects of the light unit according to the present invention. Housing (5) also comprises a first adjusting ring (10) for dimming first light element (2) and a second adjusting ring (11) for dimming second light element (3). Again electrical connections and circuitry are omitted for reasons of clarity. If LEDs emitting different wavelengths are used, A third adjusting ring (not shown) can be present for adjusting the relative intensities of these different LEDs. The dotted line indicated by reference (12) refers to a rotational axis, which is defined by the structure of the caps (6, 8) and fitting (7).

FIG. 2 shows a schematic top view of a second embodiment of the invented light unit (1). The dotted line (13) indicates part of the first light element (2), more precisely the outer circumference of the glass envelope a conventional lamp. The solid line indicates the outer circumference of the second light element (3), more precisely housing (5). It comprises three protrusions (14), positioned under an angle of 120 degrees, each having three LEDs (4), which, in operation, emit the colours Red, Green and Blue, respectively. The housing has been provided by means for receiving a remote control signal for activating and dimming the LEDs individually.

It is noted that the three series of three R,G,B-LEDs can also be positioned on a disk-shaped protrusion which extends in all directions perpendicular to the axis (12). It has however been shown that the use of separate protrusions as depicted in this Figure have the advantage that the LEDs are better cooled. Moreover such disk will block the part of the light from the light unit which is directed downwards. Finally such disk will form an obstacle for the rods which carry the shade of a (standing) luminaire.

Two front views of a third embodiment of the invented light unit (1) are shown in FIG. 3. More precisely, FIG. 3-A shows a LED-module (corresponding with lighting element (3)), which can be used as an independent part in a lighting unit (1) as invented. This lighting module shows a housing (5) with a cap (6) and a fitting (7), being positioned at opposite parts of the housing. The housing comprises a series of four protrusions (14), each being provided with three LEDs (4). In operation, each of these three LEDs emits radiation, which is detected by the human eye as the colours Red, Green or Blue. These colours can be activated and dimmed individually by a remote control signal, which is generated by a remote control transmitter.

The housing (5) also comprises a second series of four protrusions (15), which are mainly composed of a diffuser means. In practise these protrusions consist mainly diffuser resin material. These diffusers can be used to diffuse the light effects generated by the light unit, and especially the light effects generated by the light emitted by the LEDs. If desired, the diffusers may be provided with a structure for collimating the light emitted by the LEDs (not shown). In case that a the light effects generated by the LEDs should be less pronounced, protrusions (15) with diffuser means are positioned directly in front of the emission direction of the LEDs, for example by rotating them manually. In case that the pronounced light effect is desired again, the protrusions (15) are rotated outside the emission direction of the LEDs.

FIG. 3-B shows another front view of the third embodiment of the lighting module (3), now being removably attached to a first light unit (2) in order to obtain a light unit. As can be seen both series of protrusions are provided with hinges (16). The hinges on protrusions (15) allow for (partial) moving away of the diffuser means outside the emission direction of the LEDs provided on protrusions (14). This movement of the diffuser means can be in addition to or instead of their movement by rotation, as described in the preceding paragraph.

Interesting is also the feature that the protrusions (14) can continuously rotate during operation of the LEDs. This provides an interesting light distribution of the complete lighting unit (in which the light of the first and second light element are mixed) on the ceiling and the floor. Moreover a better cooling of the LEDs is obtained under these circumstances, as the air cooling is now being forced. Air cooling can also be improved in case that cooling ribs (17) are provided on the surface of the protrusions faced away from the surface on which the LEDs are positioned. These cooling means are effective both in a module in which the protrusions are rotating or are not rotating. A skilled person will immediately recognize that the protrusions (15) can also rotate with the same angular velocity as the protrusions (14). They can be either in the diffusing mode (diffuser means in emission direction of the LEDs) or non-diffusing mode (diffuser means outside the emission direction of the LEDs).

FIG. 4 shows a further schematic view of another embodiment of the invented light unit. It comprises a first light element (2) formed as a conventional lamp and a second light element (3) with four protrusions (14), each having three LEDs (4) emitting Red, Yellow and Blue respectively. The protrusions are again attached to the remainder of the housing (5) via hinges (16), being positioned to middle part of the protrusions.

It is stressed that the individual second light element (2) is seen as part of the present invention. This individual element can be used in the form of a LED module, which can be positioned between the fitting of a conventional lamp and the fitting of a luminaire.

It should be noted that the above-mentioned embodiments illustrate rather than limit the invention, and that those skilled in the art will be able to design many alternative embodiments without departing from the scope of the appended claims. In the claims, any reference signs placed between parentheses shall no be construed as limiting the claim. Use of the verb 'comprise' and it conjugations does not exclude the presence of elements or steps other than those stated in a claim. The article 'a' or 'an' preceding an element does not exclude the presence of a plurality of such elements. The invention may be implemented by means of hardware comprising several distinct elements and by means of a suitable programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A lighting unit, comprising:

a first light element formed as a conventional light source and including a second lamp cap; and a second light element, comprising:

a housing;

a conventional lamp cap;

a plurality of protruding elements extending outwardly from the housing, the plurality of protruding elements bearing a plurality of LEDs, wherein each protruding element of the plurality of protruding elements comprises a hinge that enables the protruding element to rotate around at least one axis tangential to the housing, the hinge being located between ends of the protruding element; and a fitting to fittingly receive the first light element, wherein the housing substantially surrounds the fitting, wherein:

the first and the second light elements are removably attached via the fitting and the second lamp cap, and the fitting and the second lamp cap provide electrical and mechanical connection between the first and the second light elements, the lighting unit further comprising a rotational axis defined by the conventional lamp cap, the second lamp cap and the fitting of the LED module, wherein the plurality of protruding elements are rotatable around the rotational axis with respect to the housing.

2. The lighting unit according to claim 1, wherein the plurality of protruding elements are evenly distributed around the housing of the second light element.

3. The lighting unit according to claim 2, wherein the plurality of LEDs of the lighting unit are positioned symmetrically relating to the rotational axis.

4. The lighting unit according to claim 1, wherein the second light element comprises a plurality of diffuser elements extending outwardly from the housing.

5. The lighting unit according to claim 1, wherein the plurality of LEDs comprise at least two types of LEDs emitting in operation radiation with at least two different wavelengths, and wherein each type of the LEDs can be activated independently.

6. The lighting unit according to claim 1, wherein the first light element is dimmable.

7. The lighting unit according to claim 1, wherein the second light element is dimmable.

8. The lighting unit according to claim 6, wherein the dimming is effected by means of remote control.

9. The lighting unit according to claim 1, wherein at least some of the plurality of LEDs are arranged as an LED module.

10. The lighting unit according to claim 1, wherein each of the plurality of protruding elements bears a plurality of LEDs.

11. The lighting unit according to claim 1, wherein the plurality of protruding elements is structurally configured so as to facilitate heat dissipation from the plurality of LEDs.

12. The lighting unit according to claim 1, wherein the plurality of protruding elements comprises three protruding elements disposed at 120 degree intervals around the housing.

13. The lighting unit according to claim 4, wherein the plurality of protruding elements is configured to rotate automatically during the operation of the lighting unit.

14. A lighting apparatus, comprising:

a first light element formed as a conventional light source and including a second lamp cap; and a second light element bearing a plurality of LEDs, the second light element comprising:

a housing having protruding elements extending outwardly from the housing, the plurality of LEDs being located on the protruding elements, wherein each protruding element of the plurality of protruding elements comprises a hinge that enables the protruding element to rotate around at least one axis tangential to the housing, the hinge being located between ends of the protruding element;

a conventional lamp cap;

a plurality of diffuser elements extending outwardly from the housing; and a fitting to fittingly receive the first light element, wherein the housing substantially surrounds the fitting, wherein:

the first and the second light elements are removably attached via the fitting and the second lamp cap, and the fitting and the second lamp cap provide electrical and mechanical connection between the first and the second light elements, the lighting unit further comprising a rotational axis defined by the conventional lamp cap, the second lamp cap and the fitting of the LED module, wherein the plurality of protruding elements are rotatable around the rotational axis with respect to the housing.

15. The lighting apparatus according to claim 14, wherein the plurality of diffuser elements are evenly distributed around the housing.

16. The lighting apparatus according to claim 14, wherein the plurality of diffuser elements are configured to diffuse light effects generated by the lighting apparatus.

17. The lighting apparatus according to claim 14, wherein each of the plurality of diffuser elements is configured to be folded in and outside an emission direction of the plurality of LEDs via a hinge.

18. The lighting apparatus according to claim 14, wherein the second light element further comprises a plurality of protruding elements extending outwardly from the housing and evenly distributed around the housing, wherein each of the protruding elements bears at least one LED.

19. A lighting apparatus, comprising:

a first light element formed as a conventional light source and including a second lamp cap; and a second light element bearing a plurality of LEDs, the second light element comprising:

a housing;

a conventional lamp cap;

a plurality of rotatable protrusions extending outwardly from the housing, wherein the plurality of rotatable protrusions rotates around a rotational axis defined by the conventional lamp cap, the second lamp cap and the fitting of the LED module, and wherein each rotatable protrusion of the rotatable protrusions comprises a hinge that enables rotating of the rotatable protrusion around at least one additional axis different from the rotational axis, the hinge being located between ends of the protruding element; and a fitting to fittingly receive the first light element, wherein the housing substantially surrounds the fitting, wherein:

the first and the second light elements are removably attached via the fitting and the second lamp cap, and the fitting and the second lamp cap provide electrical and mechanical connection between the first and the second light elements wherein the plurality of rotatable protrusions comprises a plurality of protruding elements each bearing a plurality of LEDs.

20. The lighting apparatus according to claim 19, wherein the plurality of LEDs is controlled by at least one remote control signal.

21. The lighting apparatus according to claim 19, wherein the plurality of rotatable protrusions further comprises a plurality of diffuser elements configured to diffuse light effects generated by the lighting apparatus.

22. The lighting apparatus according to claim 21, wherein at least one diffuser element of the plurality of diffuser elements is attached to a protruding element of the plurality of protruding elements via a hinge.

23. The lighting apparatus according to claim 19, wherein the at least one diffuser element is configured to be folded in and outside an emission direction of the plurality of LEDs via the hinge.

* * * * *